May 9, 1939. N. W. THOMPSON 2,157,360
CORRECTION DEVICE FOR GYROCOMPASSES
Filed July 28, 1936 3 Sheets-Sheet 1
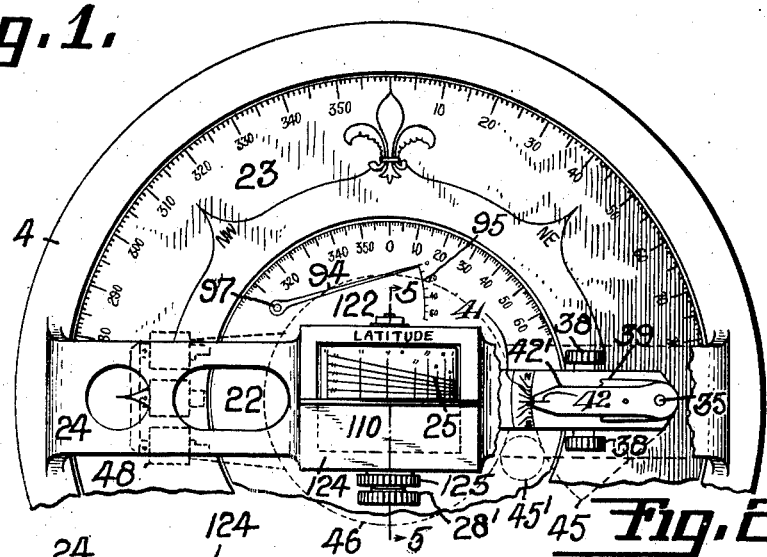
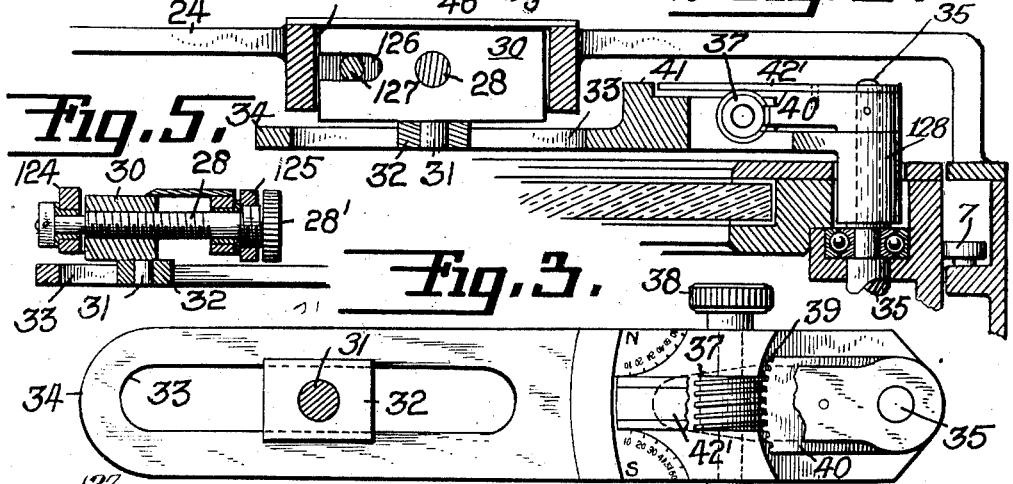
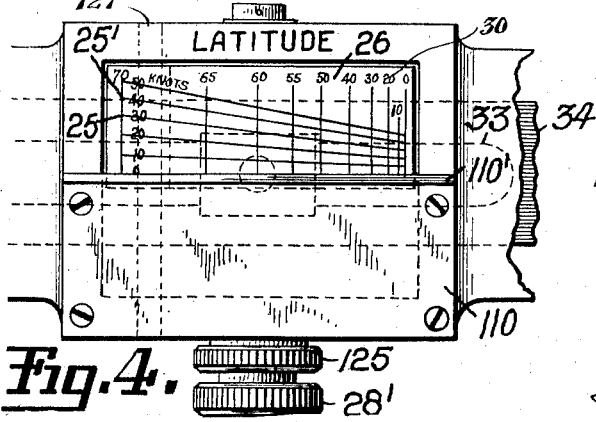
INVENTOR
NORMAN W. THOMPSON
BY
Herbert H. Thompson
HIS ATTORNEY.

May 9, 1939. N. W. THOMPSON 2,157,360
CORRECTION DEVICE FOR GYROCOMPASSES
Filed July 28, 1936 3 Sheets-Sheet 2

INVENTOR
NORMAN W. THOMPSON
BY
Herbert A. Thompson
HIS ATTORNEY.

May 9, 1939.  N. W. THOMPSON  2,157,360
CORRECTION DEVICE FOR GYROCOMPASSES
Filed July 28, 1936  3 Sheets-Sheet 3
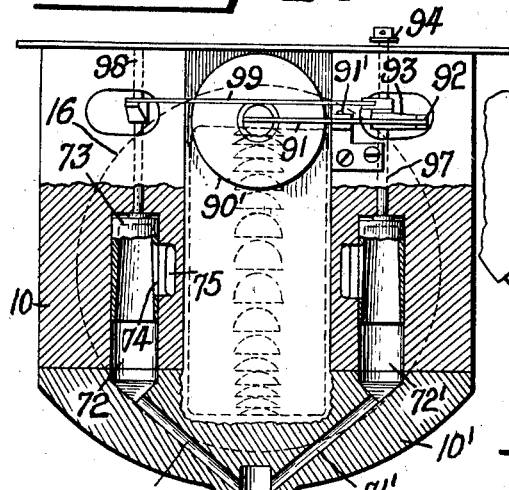
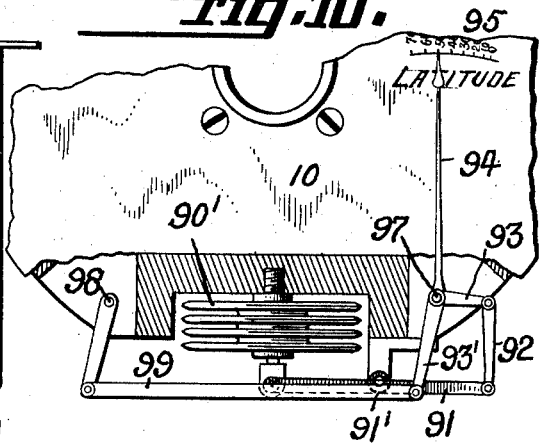
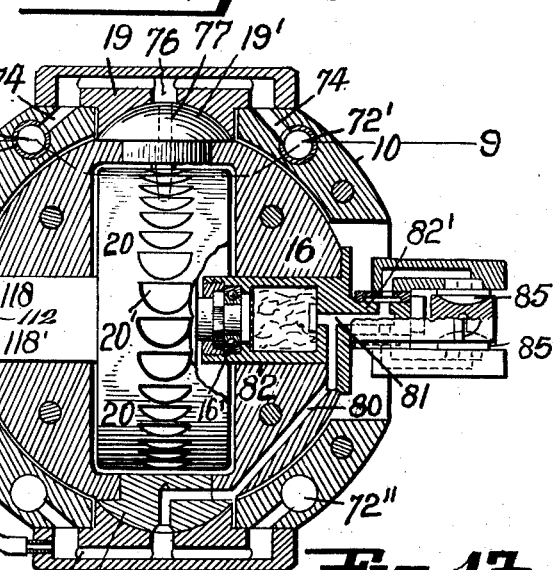
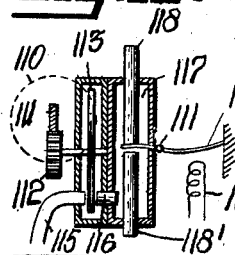
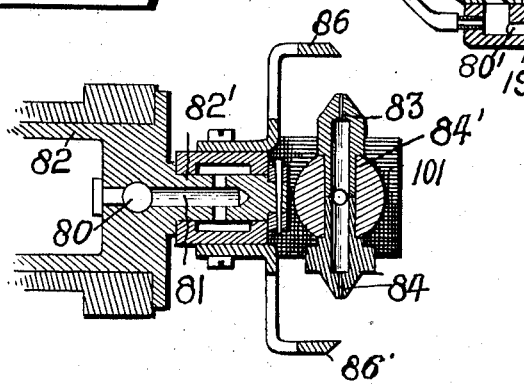
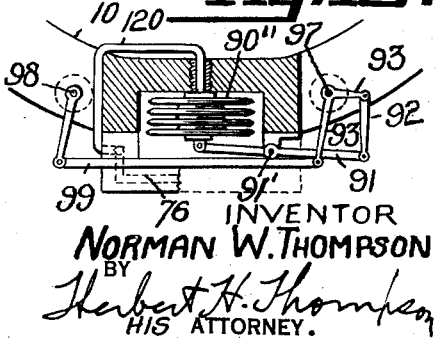
INVENTOR
NORMAN W. THOMPSON
BY
Herbert H. Thompson
HIS ATTORNEY.

Patented May 9, 1939

2,157,360

UNITED STATES PATENT OFFICE

2,157,360

CORRECTION DEVICE FOR GYROCOMPASSES

Norman W. Thompson, Brooklyn, N. Y., assignor to Sperry Gyroscope Company, Inc., Brooklyn, N. Y., a corporation of New York Application July 28, 1936, Serial No. 92,951

15 Claims. (Cl. 33—226)

This invention relates to correction devices for gyroscopic compasses for the purpose of maintaining true meridional readings and a constant period regardless of changes of speed, course and latitude.

The usually accepted formula for the speed-course-latitude error in gyro compasses on moving ships is as follows:

$$(1) \quad \tan E = \frac{S \cos C}{V \cos L}$$

where E is the error or the angle measured clockwise from true north to the gyro spin axis, C is the course angle of the ship measured clockwise from true north, S is the speed of the ship over the earth's surface, V is the surface speed of the earth at the equator due to its rotation, and L is the latitude. The above formula, however, entirely neglects the E—W component of the ship's speed over the earth's surface. The true formula, taking this component into account, is $$(2) \quad \tan E = \frac{S \cos C}{V \cos L + S \sin C}$$

which shows that the error is the greatest for courses somewhat to the west of true north and south. If the compass is damped by a torque about the vertical axis, there is an additional term to the right hand side of the equation $(+B \tan L)$, where B is a constant.

One object of my invention is to devise a mechanism which will, when set for the proper speed and latitude, automatically apply the true correction according to the above formula.

Another object of the invention is to apply the correction as an actual movement imparted to the master compass card so that the north point on the card points to the true north, while in the usual correction device the system is to displace the lubber's line so that while the readings are apparently correct, the card does not point to the true north.

Another object of the invention is to prevent another error due to changing latitudes, caused by the fact that the natural period of a compass will vary for different latitudes, the period becoming longer with higher latitudes on account of the reduced horizontal component of the earth's rotation, which varies with the cosine of the latitude. It is now well recognized that the period of a compass, for best operation, should remain about 85 minutes. In order to keep the period constant, one may either reduce the speed of rotation of the wheel as the latitude increases or increase the gravitational moment.

According to the preferred form of my invention, I prefer to vary the equivalent of the gravitational component or meridian seeking torque in accordance with the latitude.

Referring to the drawings, showing several forms my invention may assume,

Fig. 1 is a plan view, partly in section, of a gyro compass showing my correction device.

Fig. 2 is an enlarged vertical section of a portion of the correction device.

Fig. 3 is a plan view of the rotatable slotted arm of said device.

Fig. 4 is a plan view of the setting scales for said device.

Fig. 5 is a vertical section of the setting device of the corrector.

Figs. 6 and 7 are detail plan views of a modified form of speed and latitude correcting scales.

Figure 8:
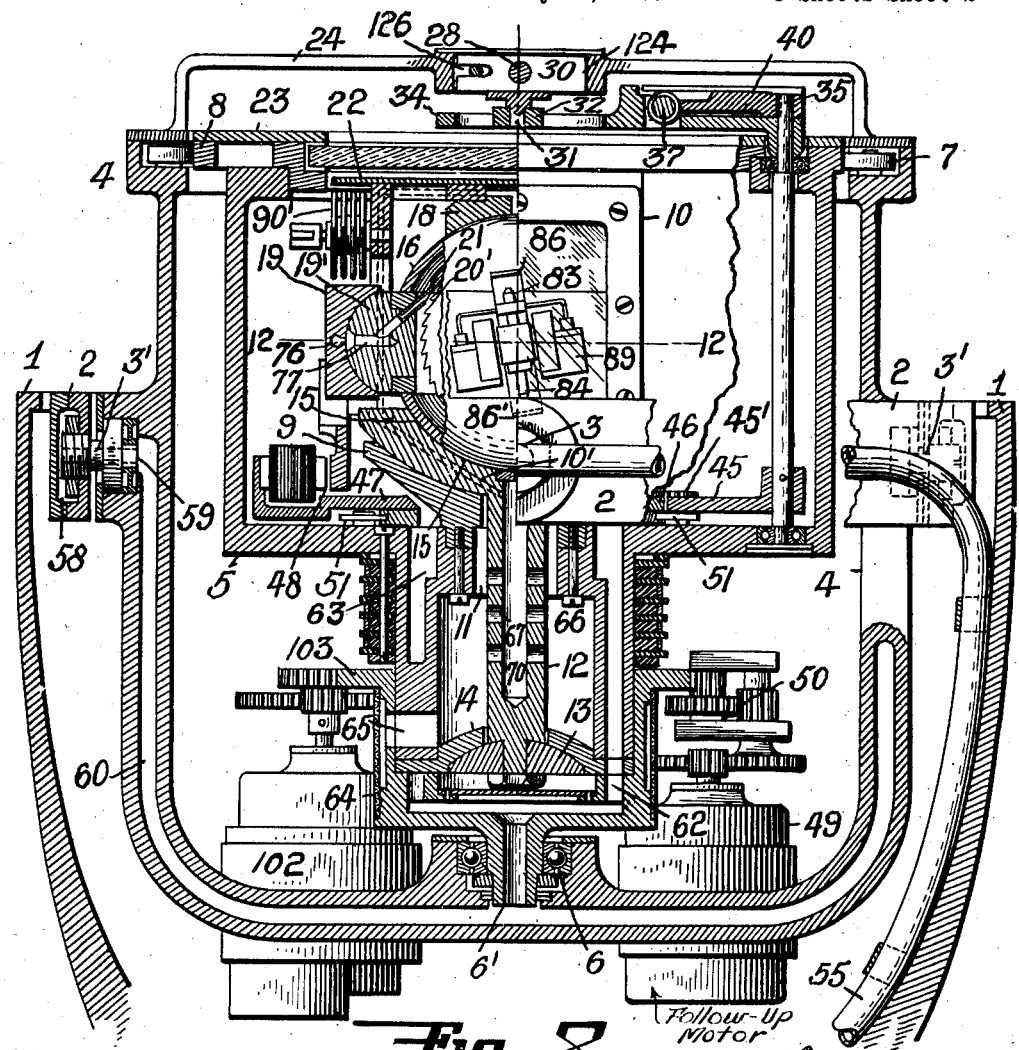
Fig. 8 is a vertical section of a gyro compass of the air borne type, showing my speed correction and latitude corrector applied thereto.
Figure 8:
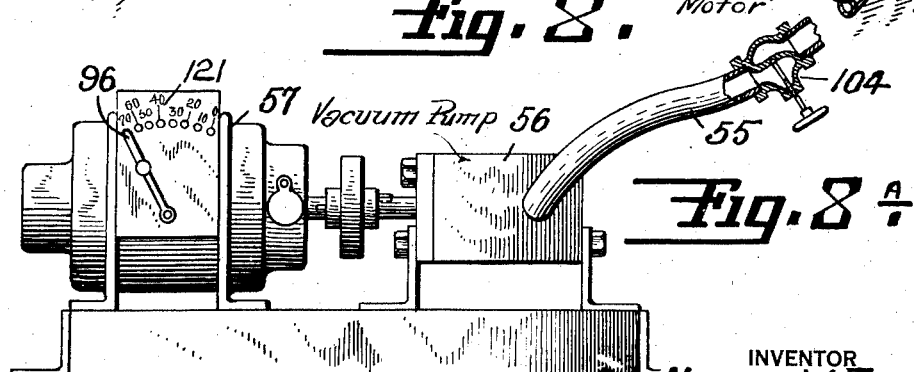

Fig. 8—A is a side elevation of the motor driven air pump for supplying the negative air pressure for spinning the gyro rotor, furnishing air for the air bearings, and ballistic control.

Fig. 9 is a vertical section, partly in elevation, through one end of the vertical ring of the compass, approximately on line 9—9 of Fig. 12.

Fig. 10 is a detailed plan view of the speed control device for the compass wheel, parts being in section.

Fig. 11 is a vertical sectional detail of the air gravitational factor and damper.

Fig. 12 is a transverse sectional view taken approximately on line 12 in Fig. 8, showing also a slight modification.

Fig. 12—A is a detail of a modified form of corrective mechanism for applying a torque to the gyro casing to correct for the damping error.

Fig. 13 is a detailed section of a modified form of speed control for the gyro rotor.

My invention is shown as applied to an air borne gyro compass of the type more completely described and shown in the patent to Carter, 2,129,818, Sept. 13, 1938, for air borne gyro compasses. As shown in Fig. 8, the compass is supported in a binnacle 1 on gimbal ring 2, the gimbal being journaled in the binnacle on axis 3 and the compass casing 4 being journaled in the gimbal ring on axis 3'—3'. Within the housing 4 there is mounted for rotation about a vertical axis a follow-up support 5, the same being shown as journaled at the bottom in said support in an anti-friction bearing 6 and at the top being guided by rollers 7 around the interior periphery of the support, which bear against the ring 8 secured to the follow-up member 5. The gyro compass proper is supported within the follow-up element by means of a plurality of air bearings. Freedom about the vertical axis is provided by a cup shaped member 9 supporting a vertical ring or frame 10 having a bowl-like bottom 10', the latter being floated in cup 9 by an air film supplied between said members through passage 11. Secured to the bowl 10' is a downwardly extending stem 12 having secured to its lower end a convex button 13 having an air film bearing between the upper surface of the same and the inverted cup 14 secured to the follow-up support 5. The vertical ring 10 is therefore supported for freedom about the vertical axis only and cannot tip about either horizontal axes or move vertically. The bowl 10' also has an upper concave or cup surface 15 supporting by an air film the hollow sphere 16, so as to support the weight of the sphere while permitting freedom about all axes. A cup 18 may also be provided at the top. Freedom about a single horizontal axis only is permitted, however, by button and cup air bearings between the cup members 19 in vertical ring 10 and buttons 19' secured in the shell 16, one only of which is shown in Fig. 8. Within the hollow sphere 16 is journaled, on ball bearings 16', disposed at right angles to the axis of buttons 19', the rotor proper 20, the rotor being preferably spun by an air jet emerging from nozzle 21 against small buckets 20' on the rotor.

At the top of the frame 10 there is secured a compass card 22, which at all times shows the true position of the gyro spin axis. The main compass card 23, however, is carried on top of the follow-up frame 5, and above this is mounted the correction device. This is shown as comprising a fixed cross bracket 24 secured at each end to the top of the binnacle 4 and normally placed directly athwartship. Said bracket is shown as having at the center thereof a box-like housing 124 across which is journaled a threaded shaft 28 which may be adjusted by knob 28' in a fore and aft direction on the ship and locked in place by a lock nut 125. Threaded on said shaft is a rectangular nut 30 which may have a longitudinally extending groove 126 thereon to receive the guide rod 127. The upper surface of said nut has a series of graduations 26 thereon extending parallel to shaft 28 and marked in degrees of latitude, and transverse markings 25 marked in knots, that is, speed of the ship. These lines are laid out in accordance with the Equation 2, so that when said nut is positioned so that the straight edge 110' on the cover plate 110 intersects the markings 25 and 26 at a point where the proper latitude mark intersects the proper speed mark for the ship at the time, the nut 30 will be in the proper position to introduce the proper correction, as will be now explained.

Secured to said nut is a downwardly extending pin 31, on which is rotatably mounted a squared slide 32 engaging a slot 33 in arm 34 pivoted due east on shaft 35. The arm 34 is shown as loosely journaled on shaft 35 as by a boss 128. Adjacent the lower end of shaft 35 is pinned a gear sector 45 which drives a second gear sector 46 of equal radius through pinion 45', said sector being formed on a member 47 which carries one part of the two part follow-up controller 48 which governs azimuth motor 49, geared to the follow-up frame 5 through reduction gearing 50. The two part follow-up controller 48 is of the type disclosed in Patent #1,921,983 to Wittkuhns. Member 47 is shown as journaled for limited movement within frame 5 by means of roller bearings 51. It will be evident, therefore, that slight rotation of shaft 35 will change the relation between the gyro compass and the frame 5 and card 23, by displacing one part of the two-part follow-up controller with respect to the other.

If the arm 34 were secured to the shaft 35, it would be evident that the shaft 35 would be rotated by an amount dependent upon the setting of the latitude-speed scales 25, 26 with reference to the straight edge 110' and in accordance with the relative rotation or angular position of follow-up frame 5 and compass card 23, which carries the arm 34 and the bracket 24, which is fixed to the ship. When the parts are in the position shown on Fig. 1, that is, when the ship is heading due north, it is evident that the pin 31 is displaced from the central position shown in Fig. 3, which is at the center point of the compass, and will impart nearly the maximum rotation to the arm 34, but that as the ship turns east or west, the correction will be reduced in accordance with the cosine C of the angle, with a slight correction for sine C noted in Equation 2. The follow-up system is thus held in the true meridian, the card 23 therefore indicating the true meridian while the card 22 indicates the exact position of the gyro compass. Since the follow-up frame is held in the true meridian, true north may also be indicated at a distance by driving a repeater compass transmitter 102, fixed in frame 4, from gear 103 on the base of element 5.

It is obvious that the latitude and speed graduations need not be all placed on one of the relatively moving parts, i. e., nut 30 or plate 110. In Figs. 6 and 7, for instance, I have shown the speed lines 35' as placed on the nut 30, while the latitude markings 26 are placed on the straight edge 110'.

If the compass is equipped with a damper about the vertical axis, an additional factor "B tan L" is necessary, and this may be supplied by journaling on the arm 34 a threaded shaft 37 provided with knurled heads 38, the threads of which shaft mesh with a gear sector 39 on an arm 40, which is pinned to shaft 35. Marked on arm 34 is another latitude scale 41 marked from the center point zero in both directions for north and south latitudes, which is read in connection with a reference mark 42 on an arm 42' secured to the sector 40. The operator, therefore, also turns the knobs 38 to bring the reference mark 42 on arm 42' into coincidence with the proper latitude reading. This results in giving the compass card 23 an additional displacement proportional to the tangent of the latitude, "B" being a constant which varies with the damping factor.

Another portion of my correction mechanism pertains to means for varying the gravitational factor in order to keep the period constant in different latitudes. While this idea in itself is not new, its application to the particular form of compass disclosed herein and claimed more particularly in the aforesaid patent application of Leslie F. Carter, presents much difficulty and to understand the same, a brief description of the means employed to drive this compass is necessary.

As before stated, both the spinning of the rotor and the flotation of the bearings is accomplished by air under pressure, and I also preferably use air to exert the necessary torque on the gyro for meridian seeking purposes. For this purpose, I preferably make the follow-up frame 5 substantially air-tight and exhaust air continuously therefrom through pipe 55 by means of a vacuum pump 56, shown as driven from a variable speed motor 57. The pipe 55 is shown as leading through the trunnion 3 into the gimbal ring 2, which has therein a channel 58 communicating with the hollow trunnions 59 of pivots 3', 3', said hollow trunnions connecting with air channels 60 in the outer frame 4. Said channels are connected through the lower hollow trunnion 6' of the bearing 6 to the interior of the frame 5, the passage leading thence to the vertical channel 62 connected with annular channel 63 and communicating with the upper interior portion of the frame 5, so as to continuously exhaust the same of air. Atmospheric air is admitted through screen 64 in opening 65 into the chamber 66, whence some of the air passes through radial bores 67 into the vertical channel 70 of the stem 12. Connected to said channel are one or more small bores 71 and 71' leading to cylinder-like channels 72 72' within frame 10 (Fig. 9). Sleeve valves 73 are provided within said channels which, upon rotation, partially close lateral ports 74 which lead into the annular channels 75 connected by a bore 76 in the cup 19 formed in the part 10. Thence the air passes into the radial channel 77 in button 19', connected with the spinning nozzle 21, some of the air escaping between the button 19' and cup 19 to air float the former. The purpose of the sleeves 73 is to vary the opening of the ports 74. This obviously may be used to vary the speed of the wheel, if desired, but in this particular construction it is used to keep said speed constant, as will be hereinafter explained.

Another portion of the air entering chamber 66 passes upwardly through passage 11 to supply air to the air bearing 9. Another portion of the air passing upwardly through channel 70 escapes between the upper cup 18 in part 10 and the lower portion of the spherical casing 16.

Air is supplied to the ballistic member from channel 72", similar to channels 72, 72', the air passing through the opposite button 19' in a similar manner, and thence through passageway 80 into channel 81 in the stub shaft 82' on sleeve 82, containing one of the bearings 16' for the rotor 20. The ballistic member in this case is shown as a pair of oppositely directed nozzles 83 and 84 which are pendulously mounted on air bearings 85, 85' so that the member constitutes a small pendulum 84' which directs air jets upwardly and downwardly against baffle members 86, 86' secured to a U-shaped block 101 journaled on shaft 82'. Normally, the ends of the baffle plate intercept the jets equally, but whenever the casing becomes inclined with respect to the jets in the E—W plane, one jet is intercepted more than the other, resulting in an unbalanced torque about the horizontal axis of the gyroscope in the proper direction to cause it to precess toward the meridian. Preferably, the jets are slightly inclined to the vertical in the E—W plane, as shown in Fig. 8, so that a damping torque is exerted at the same time the meridian seeking torque is exerted, after the manner outlined in the prior patent to Herbert H. Thompson, #1,773,411, dated August 19, 1930. The little pendulum 84' may also be damped by oil wells 89, if desired.

As stated above, I prefer to vary the gravitational factor rather than the speed of the rotor, but in order to do the former, I find it preferable to vary the rate at which the air is withdrawn from the casing 5, in accordance with the latitude, so as to vary the torque exerted by jets 83 and 84. In order to provide an accurate gauge and rate determining means, I have shown mounted on the side of the gyro casing a simple form of aneroid barometer or pressure gauge 90', which is connected through lever 91 pivoted at 91', link 92 and crank 93, to a pointer 94 movable over a scale 95, which may be graduated in degrees of latitude, as shown. The operator then adjusts the speed of the motor 57 by means of rheostat 96, or adjusts a throttle valve 104 so that the gauge 95 reads the proper latitude to give the proper ballistic moment for that latitude.

In order, however, to maintain the speed constant at the same time, I preferably connect the pressure gauge or barometric means 90' to the aforesaid sleeve valves 73. As shown, one of the valves is connected to the stem 97 supporting the pointer 94, while the stem 98 of the other valve is connected to stem 97 through a suitable link 99 and bellcrank 93, 93'. By proper design, the valves 73 are adjusted so as to throttle the air leading to the spinning nozzle 21 in the same proportion as the pressure differential within the casing 5 increases, so that the speed of the rotor is maintained substantially constant regardless of changes in vacuum for different latitudes.

Instead of applying the damping correction in accordance with B tan L to the card, as shown by the correction knobs 38 in Figs. 1 and 2, this mechanism may be eliminated from the correction device and a corrective torque applied directly to the gyro casing, if desired, as indicated in Figs. 12 and 12—A. Since the gyro casing is sealed within the air-tight casing 5, I have provided a special means to apply this torque, preferably by means of an air jet or jets controlled by the latitude adjustment of the compass. As explained above, the air pressure within the casing 5 is varied in accordance with latitude to keep the pointer 94 on the proper latitude indication at 95. This variation in air pressure cannot be used directly, however, for my purpose, since the air pressure within the case is varied in accordance with different functions of latitude than is necessary for the corrective torque, the air pressure in the case being varied in accordance with the secant of the latitude, while the corrective torque in question should be varied in accordance with the tangent of the latitude, with the proper change in sign for north and south latitudes. To this end, I have shown a second barometric or air pressure responsive device 110 (Figs. 12 and 12—A) which moves a rack bar 111 to rotate a pinion 112, the shaft of which carries a disc 113 having a series of holes 114 therein of increasing size. Registering with said holes is a pipe 115, obtaining air from channels 80' leading to channel 80, and on the other side of said disc a short pipe 116 leads into a chamber 117, from which two oppositely directed pipes 118 and 118' lead, the pipes being directed upwardly and downwardly and located to one side of the E—W axes 19'—19' of the compass. The disc 113 will hence be rotated in accordance with the latitude by the changing pressure within casing 5 and an additional variation in pressure will be produced by the varying size of the openings 114. At the equator no torque should be applied to the gyro, so that a space is left between the largest and smallest holes.

It is obvious that the torque should also be reversed in north and south latitudes. For this purpose, I have shown a thermostatic strip 119 operating to close one or the other of the inner ends of pipes 118 and 118' in accordance with whether or not the heating coil 120 is operative, the coil being, for instance, turned on in south latitudes and off in north latitudes.

From the foregoing operation of my invention it will be apparent that the settings required in the main form of the invention are the setting of the knob 28' to set the straight edge 110' so that the proper latitude markings intersect the proper speed markings, the setting of the knob 38 to the proper latitude on scale 41, and the adjustment of amount of vacuum within element 5 either by varying the speed of the motor 57 or the opening of throttle valve 104 to maintain the pointer 94 on the proper latitude marking on the scale 95. In the form of the invention shown in Figs. 12 and 12—A, where the B tan L correction at the card is unnecessary, the index 42 can be left at zero.

In connection with my correction device, it may be noted that the curves 25' are straight lines, whereas in all prior correction devices of which I am aware, such markings have been in the form of curves which are difficult to lay out by machine. In my improved correction device, therefore, I have not only achieved greater accuracy, but also have simplified the construction.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

One such modification in the rotor speed control is shown in Fig. 13. In this figure, the Sylphon or barometric device 90'' has the interior thereof connected to a pipe 120 tapped into the air supply passage 76 leading to the spinning nozzle 21, so that the compression of the Sylphon is proportional to the effective pressure differential at the nozzle, so that the device acts to keep this differential a constant regardless of changes in pressure in casing 5. In this case, the latitude scale 121 should be referred to instead of scale 95.

Having described my invention, what I claim and desire to secure by Letters Patent is:

1. In a device for correcting the readings of gyroscopic compasses having a follow-up element, a compass card turned thereby, a fixed plate, a plate adjustable parallel thereto, said plates having latitude-speed graduations thereon, an arm pivoted on said follow-up element on an axis in the E—W plane of the compass center, a block adjacent said compass center and moved by said adjustable plate and having a radially E—W slidable connection with said arm, and means for applying the angular displacement of said arm due to said block as a speed-course-latitude correction to the compass card.

2. A correction device for gyro compasses as claimed in claim 1, having an additional correction device on said arm for correcting for the damping error, said additional correction device including an adjustable connection between said arm and the follow-up element adapted to give the follow-up element a displacement proportional to the tangent of the latitude.

3. In a gyro compass having an air spinning means for the rotor and air applied meridian seeking torque means, means for maintaining the period of said compass substantially constant for different latitudes, including means for varying the air pressure supplied to said torque means in accordance with the latitude of position.

4. In a gyro compass having an air spinning means for the rotor, air jet meridian seeking torque applying means and a common means for supplying differential air pressure to both said means, means for maintaining the period of said compass substantially constant for different latitudes, including means for adjusting the air pressure supplied by said supply means in accordance with latitude, and means for conversely throttling the air pressure supplied to the spinning means to maintain the rotor speed substantially constant.

5. In a gyro compass having an air spinning means for the rotor and air jet meridian seeking torque applying means, a casing for the compass, a pump for continuously exhausting the air therefrom, intake channels leading air to said spin means and said torque means, means for varying the rate of exhaust by pump in accordance with latitude, a pressure responsive device in said casing, and means operated thereby for maintaining the velocity of the air supplied through the channel to the rotor spin means substantially constant despite changes in said rate of exhaust.

6. A gyro compass as claimed in claim 5, having a latitude indicator on the compass also actuated by said pressure responsive device.

7. In a gyro compass, air pressure means for controlling the meridian seeking torque thereto, and means for maintaining a constant period for different latitudes, including means for varying said pressure in accordance with a function of the latitude.

8. In a gyro compass, air pressure means for applying the meridian seeking torque thereto, air pressure means for applying a damping error corrective torque thereto, means for varying the air pressure supplied to said first means in accordance with the secant of the latitude, and means for varying the air pressure supplied to said second means in accordance with the tangent of the latitude.

9. In an air borne gyro compass, a casing, means for continuously exhausting the air therefrom, air jet means within said casing for applying the meridian seeking torques to the compass, and means for maintaining a constant period for different latitudes, including means for varying the rate of exhaust from said casing to vary said torque with changes in latitude.

10. In an air borne gyro compass, a casing, means for continuously exhausting the air therefrom, air jet means within said casing for applying the meridian seeking torques to the compass, air jet means within said casing for applying a damping error corrective torque to the compass, means for varying the air pressure within said casing to vary one of said air jet means in accordance with the proper function of the latitude, a pneumatic gage having a latitude scale and adapted to measure said air pressure in terms of a function of latitude, and means whereby the pressure on the other air jet means may be regulated from said air pressure changes within said casing in accordance with another function of the latitude.

11. In a gyro compass having an air spinning means for the rotor and air jet means for applying meridian seeking torque to the compass, a casing for the compass, a pump for continuously exhausting the air therefrom, intake channels leading air to said spinning means and said torque means, means for varying the rate of exhaust by the pump in accordance with latitude, an expansible container responsive to the difference in pressure within said casing and the pressure at said air spinning means, and means operated thereby for maintaining said difference substantially constant irrespective of variations in said rate of exhaust.

12. A correction device for gyroscopic compasses having a follow-up and a sensitive element turnable about a vertical axis, a radially slotted arm pivoted on the former to one side of said axis, a fixed bracket which turns with the ship, a block slidably mounted therein in the fore and aft direction of the ship and having a slidable and pivotal coupling through said slot to said arm, a combined speed-latitude scale by which said block may be adjusted for the proper ship's speed and latitude, whereby the center thereof is displaced from the aforesaid vertical axis by the amount of said adjustment, follow-up control parts between said two elements, and means for displacing the control parts carried by one of said elements by the turning of said arm whereby the position of the follow-up element is correct for speed and latitude.

13. A correction device for gyroscopic compasses having a follow-up and a sensitive element turnable about a vertical axis, an arm pivoted on the former to one side of said axis and having an E—W slot, a block mounted for sliding in and along said slot, a fixed bracket which turns with the ship, a second block slidably mounted therein in the fore and aft direction of the ship, a combined speed-latitude scale by which said block may be adjusted for the proper ship's speed and latitude, a pivotal connection between said blocks which is displaced from the aforesaid vertical axis by the amount of said adjustment, follow-up control parts between said two elements, and means for displacing the control part carried by one of said elements by the turning of said arm whereby the position of the follow-up element is corrected for speed and latitude.

14. In a gyro compass having an air spinning means for the rotor and air applied meridian seeking torque means, means for maintaining the period of said compass substantially constant for different latitudes, including means for varying the air pressure supplied to one of said rotor spinning means and said torque means in accordance with the latitude of position.

15. In a gyro compass having an air spinning means for the rotor, air actuated means for applying meridian seeking torque to the compass and a common means for supplying air pressure to both said means, means for maintaining the period of said compass substantially constant for different latitudes, including means for changing the air pressure supplied by said supply means in accordance with latitude of position, and means responsive to said changes in air pressure for conversely throttling the air pressure supplied to only one of said two first-named means to maintain constant the pressure supplied to said one means while the other is varied with latitude of position.

NORMAN W. THOMPSON.